W. F. ROBERTS.
COIN HOLDER AND INDICATOR FOR RECEPTACLES.
APPLICATION FILED MAY 5, 1916.
1,237,700.  Patented Aug. 21, 1917.
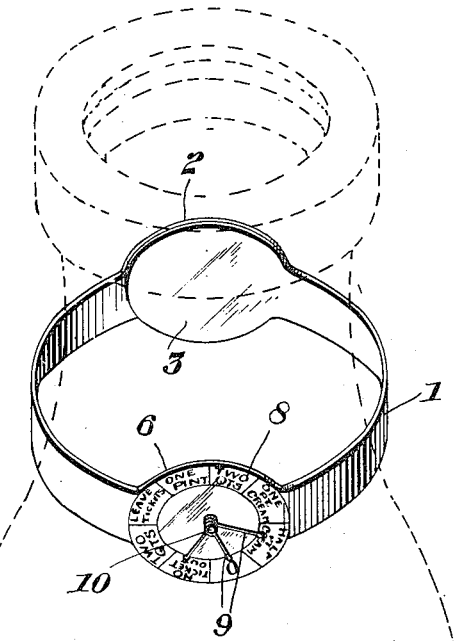
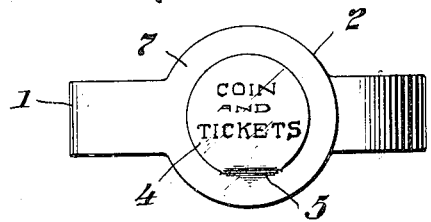 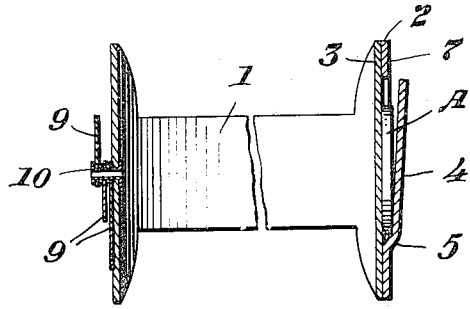
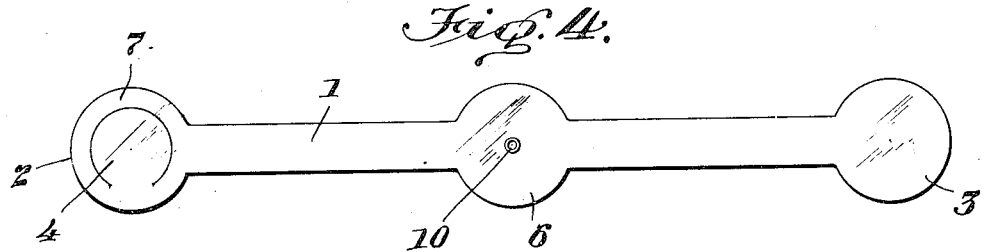
Witness
Ernest H. Crocker
Inventor
William F. Roberts
By F. W. Bond
Attorney

UNITED STATES PATENT OFFICE.

WILLIAM F. ROBERTS, OF SAN ANTONIO, TEXAS.

COIN-HOLDER AND INDICATOR FOR RECEPTACLES.

1,237,700.

Specification of Letters Patent.

Patented Aug. 21, 1917.

Application filed May 5, 1916. Serial No. 95,704.

*To all whom it may concern:*

Be it known that I, WILLIAM F. ROBERTS, a citizen of the United States, residing at San Antonio, in the county of Bexar and State of Texas, have invented a new and useful Coin-Holder and Indicator for Receptacles, of which the following is a specification.

This invention relates to coin holders and indicators for receptacles and has more especial reference to a portable device adapted to be temporarily attached to a milk jar or the like and provided with an indicating device adapted to indicate the amount of milk or cream desired and also provided with a pocket adapted to receive a coin or a milk ticket such as are purchased from the dairymen in certain localities.

As the milk is generally delivered at an early hour in the morning it is usually inconvenient for the purchaser to present the coin or milk ticket and to order the amount of milk or cream desired, in person, and it is often necessary to leave a note with the empty milk bottle and ticket or coin, telling the dairyman the amount of milk or cream desired.

The object of the present invention is to provide a device by means of which the coin or milk ticket may be placed with the empty bottle together with means for indicating the amount of milk or cream desired by the purchaser.

A further object is to provide a device of this character having means for holding the coin or milk ticket upon the milk bottle and permitting the same to be readily removed therefrom by the dairyman.

A further object is the provision of a device of this character which is inexpensive in construction and efficient in use.

With these objects in view the invention consists in the novel construction and arrangement of parts, hereinafter described, illustrated in the accompanying drawings, and particularly pointed out in the appended claim, it being understood that various changes in the form, proportions, size and minor details of construction may be made within the scope of the appended claim without departing from the spirit or sacrificing any of the advantages of the invention.

In the accompanying drawings:

Figure 1 is a perspective view of a device embodying my invention, showing the manner of applying the same to a milk jar.

Fig. 2 is an elevation of the same showing the pocket for containing coin or tickets.

Fig. 3 is a similar view through the same on an enlarged scale.

Fig. 4 is a view of the inner face of the blank from which said device is formed.

Similar numerals of reference indicate corresponding parts throughout the several figures of the drawing.

Referring more especially to the construction illustrated in the accompanying drawing, the device is formed from a blank such as shown in Fig. 4. The numeral 1 indicates a strip of celluloid or other suitable material provided at its opposite extremities with the disk portions 2 and 3, the portion 2 having an integral flap 4 stamped therefrom and preferably slightly off-set as indicated at 5. A third disk portion 6 is provided intermediate the extremities of the strip 1 preferably at a point half way between the disk portions 2 and 3.

In forming the device from the blank above described the strip 1 is bent into circular form, the rim portion 7 of the disk 2 overlapping the disk 3 and being connected thereto by means of suitable cement or the like. The flap 4 being slightly off-set from the rim portion 7 of the disk 2 is thus spaced a slight distance away from the disk 3 thus forming the pocket to receive a coin or ticket as indicated at A in Fig. 3.

The disk 6 has imprinted upon its face a suitable dial as indicated at 8 in Fig. 1. Hands 9 are independently pivotally mounted upon the post 10 which is carried by the disk portion 6 being located at the center of the dial 8. The dial indicates both milk and cream and tickets, so that with the three independently movable hands the amount of milk and amount of cream may both be indicated and if tickets are desired or no ticket is left in the pocket of the device this may also be indicated by the third hand. A zero is provided upon the face of the dial to which any of the hands not in use may be pointed.

In use the device is slipped over the neck of a milk jar or other receptacle, the ticket or coin being inserted back of the flap 4 as indicated in the drawings and the indicating hands moved into the proper positions upon the dial to inform the dairyman what is desired.

I claim:

A device of the character described formed of a blank comprising a strip having an enlarged portion at each extremity and a third enlarged portion intermediate the extremities thereof, said third enlarged portion arranged to receive an indicator, a flap stamped from the enlarged portion at one extremity of the strip, said strip arranged to be bent into circular form, the enlarged portions at the extremities thereof arranged to be overlapped and cemented together forming a pocket.

In testimony that I claim the above, I have hereunto subscribed my name.

WILLIAM F. ROBERTS.